US006308839B1

(12) United States Patent
Steinberg et al.

(10) Patent No.: US 6,308,839 B1
(45) Date of Patent: Oct. 30, 2001

(54) MEDIA STORAGE RACK

(76) Inventors: Richard Steinberg, 12 Canary La., Bedford, NH (US) 03110; James J. Decknick, 22 Gorham Pond Rd., Goffstown, NH (US) 03045

( * ) Notice: Subject to any disclaimer, the term of this patent is extended or adjusted under 35 U.S.C. 154(b) by 0 days.

(21) Appl. No.: 09/421,898

(22) Filed: Oct. 21, 1999

(51) Int. Cl.[7] .................................................. A47G 29/00
(52) U.S. Cl. ................... 211/40; 211/43; 211/184
(58) Field of Search .................... 211/40, 41.12, 211/43, 184, 41.1; D6/407; 206/307.1, 387.14–387.15, 482, 486–488, 561, 449, 556, 308.1, 308.3; 312/9.55–9.56, 9.64, 9.1; 108/61; 220/534–535, 544, 549

(56) References Cited

U.S. PATENT DOCUMENTS

| D. 200,205 | * | 2/1965 | Davis ...................................... D6/407 |
| D. 377,425 | * | 1/1997 | Stravitz .................................. D6/407 |
| 1,046,488 | * | 12/1912 | Pauley . |
| 1,739,545 | * | 12/1929 | Cubberley . |
| 4,162,013 | * | 7/1979 | Tucker ...................................... 211/43 |
| 4,343,450 | * | 8/1982 | Anderson ................................. 211/43 |
| 4,595,098 | * | 6/1986 | Kryter ........................................ 206/556 |
| 4,728,158 | * | 3/1988 | D'Elia et al. . |
| 4,742,922 | * | 5/1988 | Demarest, Jr. ........................... 211/43 |
| 4,850,477 | * | 7/1989 | Gelardi et al. .................... 206/45.19 |
| 5,111,940 | * | 5/1992 | VanNoord ........................... 211/41.12 |
| 5,228,578 | * | 7/1993 | Wu ............................................ 211/43 |
| 5,251,749 | * | 10/1993 | Knight ................................... 206/309 |
| 5,415,297 | * | 5/1995 | Klein et al. ............................. 211/40 |
| 5,427,446 | * | 6/1995 | Glomski .............................. 312/9.47 |
| 5,474,190 | * | 12/1995 | Won-Kim ........................... 211/41.12 |
| 5,762,208 | * | 6/1998 | Yeh ......................................... 211/40 |
| 5,765,697 | * | 6/1998 | Soong ..................................... 211/40 |
| 5,823,332 | * | 10/1998 | Clausen ............................. 206/307.1 |
| 5,971,164 | * | 10/1999 | Wong ..................................... 211/40 |

* cited by examiner

Primary Examiner—Daniel P. Stodola
Assistant Examiner—Jennifer E. Novosad
(74) Attorney, Agent, or Firm—Davis & Bujold, P.L.L.C.

(57) ABSTRACT

A media storage rack for storing a plurality of different media comprising an elongate media support base supported between first and second rack ends, the base defining elongate ribs and recesses sized and positioned to locate the plurality of media securely in the rack.

9 Claims, 5 Drawing Sheets

MEDIA STORAGE RACK

This invention relates to a media storage rack capable of accommodating a plurality of different media forms and of being free standing, side mounted or supported at opposite ends by a slide/rail arrangement.

BACKGROUND OF THE INVENTION

Storage racks are well known for use to store various types of media, e.g. CDs, VHS tapes, floppy discs, etc., however, the existing designs lack versatility in the accommodation of differing forms of media in a single storage rack design.

It is an object of the present invention to provide a storage rack capable of accommodating a wide range of media forms in a simple inexpensive construction and to provide a variety of support arrangements for such a rack.

SUMMARY OF THE INVENTION

The present invention provides a media storage rack for storing a plurality of different media comprising an elongate media support base supported between first and second rack ends, the base defining elongate ribs and recesses sized and positioned to locate the plurality of media securely in the rack.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
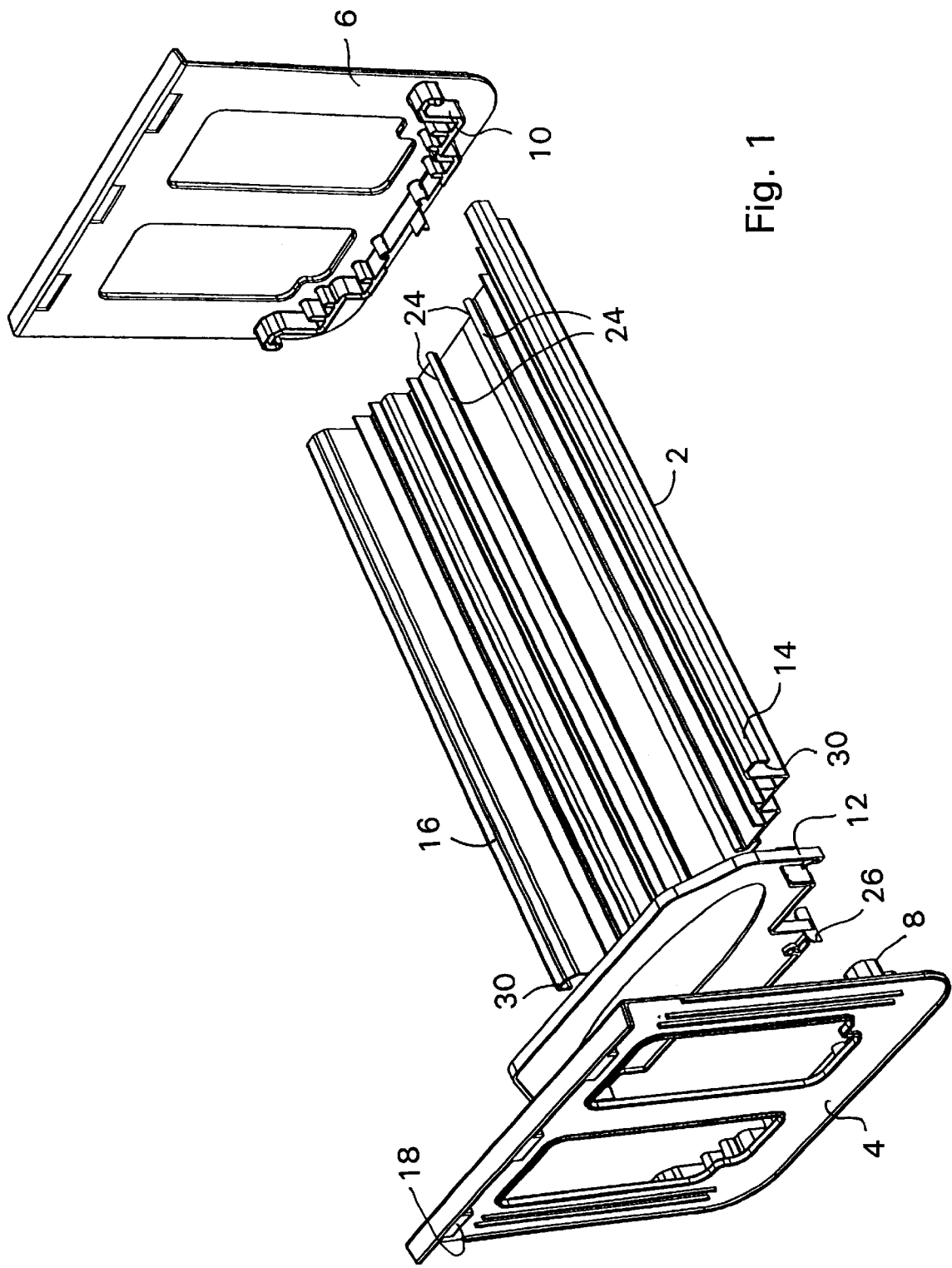
FIG. 1 is an exploded perspective view of one embodiment of the present invention.
Figure 2:
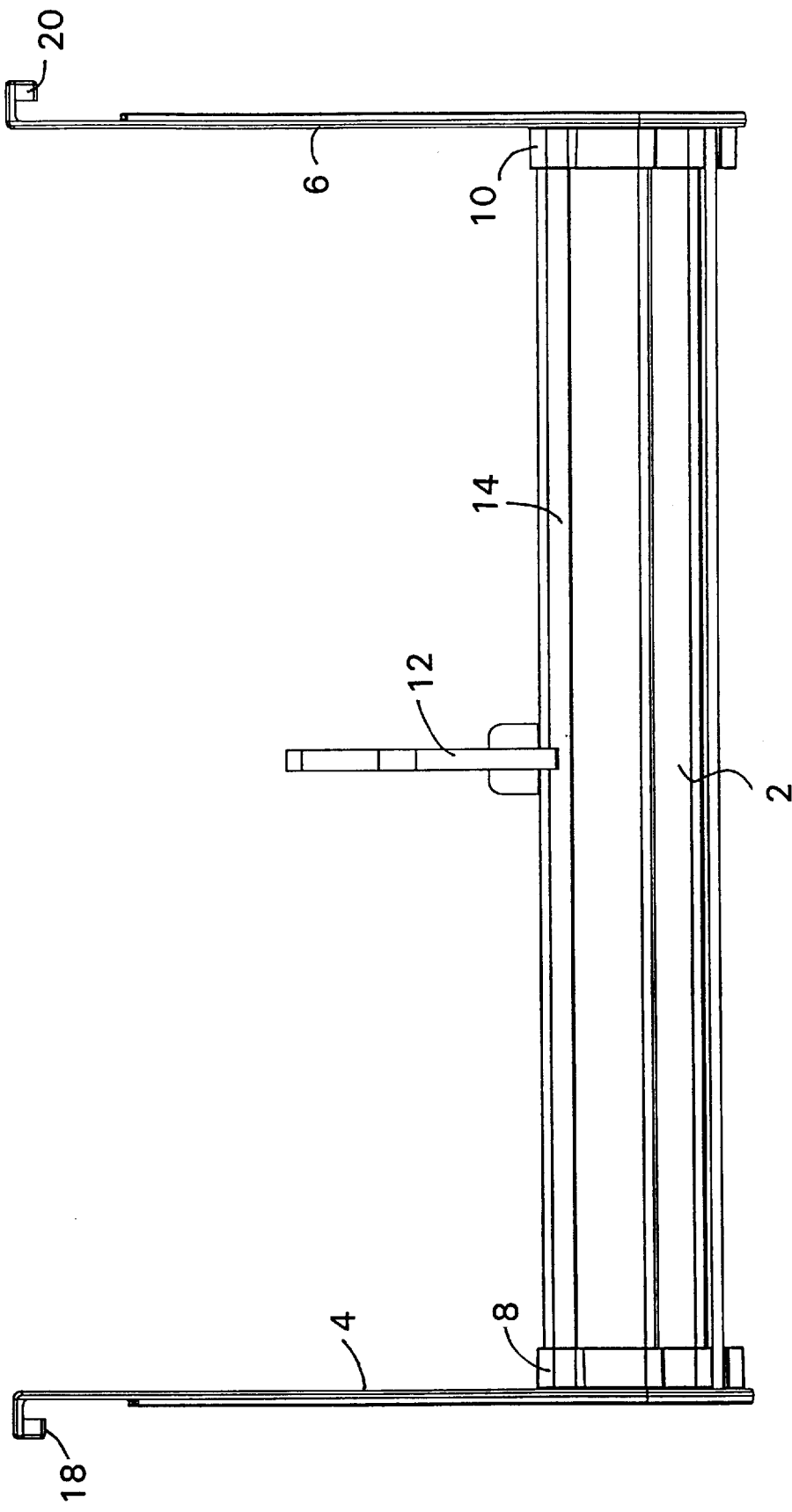
FIG. 2 is a side elevation of the embodiment of FIG. 1.

Referring first to FIGS. 1 and 2, the media storage rack of the present invention comprises a base 2 supported between first and second ends 4 and 6 by a press fit to base supports 8, 10. A divider 12 is slidably mounted on the base for movement between the ends 4 and 6 with sufficient friction to allow the divider to remain in a desired position on the base in the presence of media stored thereon.

As will be described below, the base 2 which is an elongate plastics extrusion, comprises longitudinal outer edges 14 and 16 facilitating side mounting of the rack and the ends 4 and 6 comprise end mounting features 18 and 20 facilitating the mounting of the rack by the ends, e.g. in a drawer. Of course, the rack may be used in a free standing manner.

To facilitate the orderly storage of a wide range of media (e.g. DVDs, CDs, CD ROMs, floppy discs, VHS tapes and a variety of cassettes used in the storage of data), the base 1 is provided with a plurality of longitudinally extending ribs 22 and recesses sized and spaced to provide appropriate location for the stored media.

Two of the ribs 22 are terminated by elongate beads 24 which engage mating re-entrant openings 26 in the divider 12 to captively retain the divider on the base 1.

Figure 3:
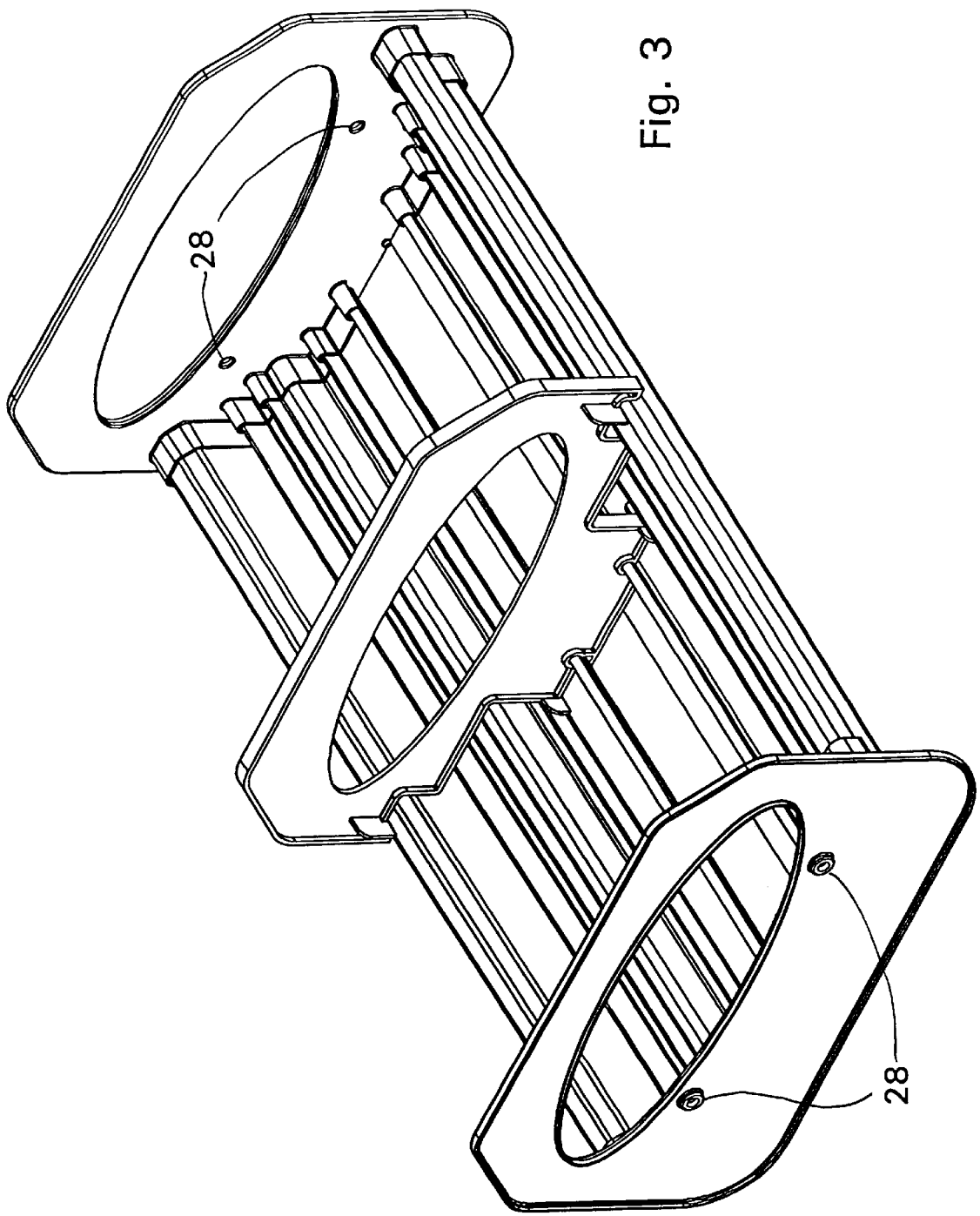
FIG. 3 is a perspective view of a second embodiment of the present invention.

FIG. 3 illustrates a second embodiment of the invention which differs from the embodiment of FIGS. 1 and 2 only by the provision of a different design for the ends 4 and 6. Here the base and the base mounting features are unchanged but rack mounting screw holes 28 in the ends are provided to facilitate screw mounting of the rack by one end or by both ends between parallel surfaces.

Figure 4:
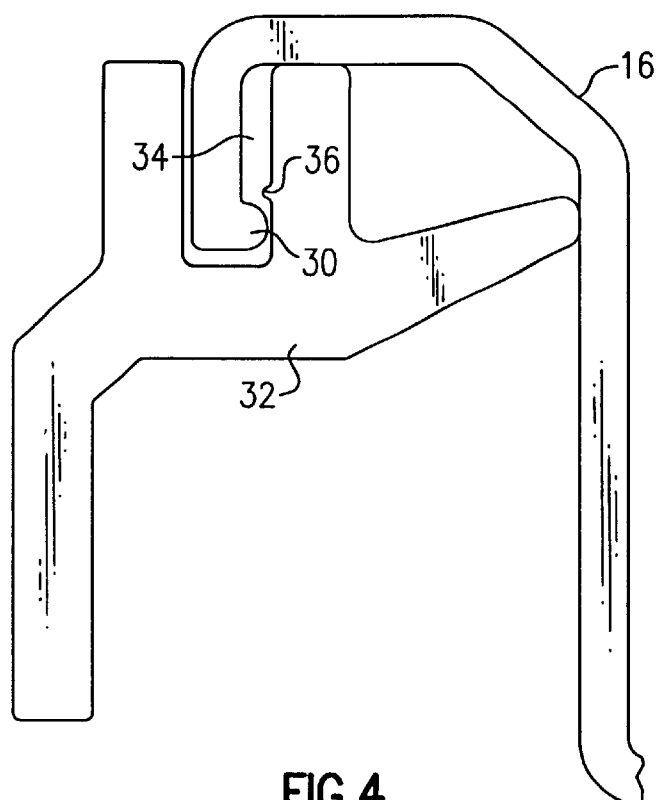
FIG. 4 is a wall mount arrangement for the invention.

FIG. 4 illustrates a side mounting arrangement of the rack by the outer edge 16. The outer edges 14 and 16 are the mirror image of one another and consist of inverted U-shaped channels terminating in longitudinally extending beads 30 projecting into the interior of the U-shape to provide a re-entrant shape to facilitate resilient captive mounting of the rack to an elongate bracket 32 which may be mounted to a vertical surface, e.g. a wall. As shown, the bracket 32 defines an upwardly facing channel 34 to receive the outer edge 16 to support the rack. The channel 34 has an internally projecting detent 36 which cooperates with the bead 30 of the outer edge 16 to resiliently retain the outer edge 16 in the channel 34 while permitting the rack to be removed from the bracket when desired.

Figure 5:
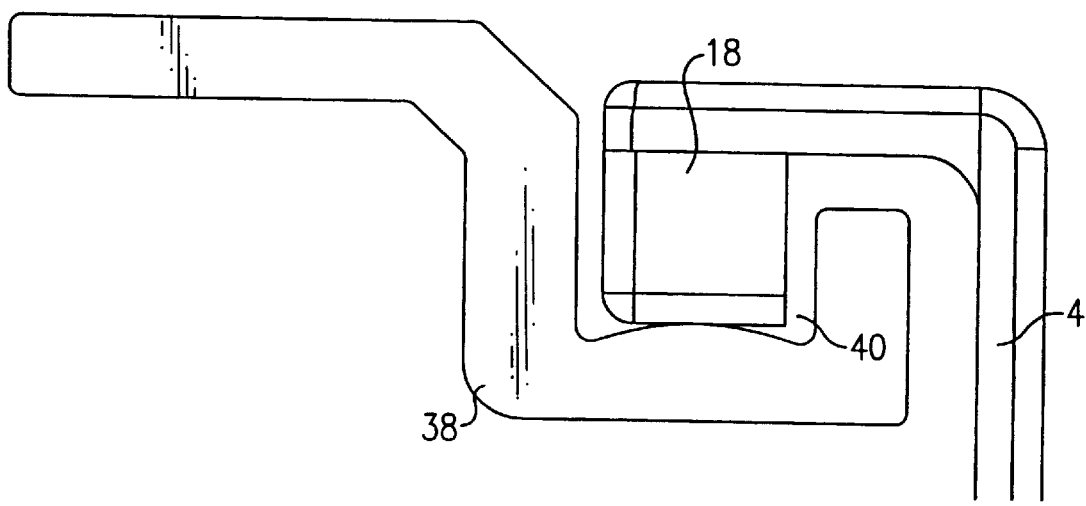
FIG. 5 is a slide/rail mount arrangement for the embodiment of FIG. 1.

FIG. 5 illustrates the mounting of end 4 on an end mounting bracket 38 which comprises an upwardly facing channel 40 to support the rack by the mounting features 18. The end mounting bracket may provide a sliding support for the rack to permit mounting under a shelf or to provide support in a drawer, etc. As will be appreciated, the other end 6 will be supported by a similar end mounting bracket.

Figure 6:
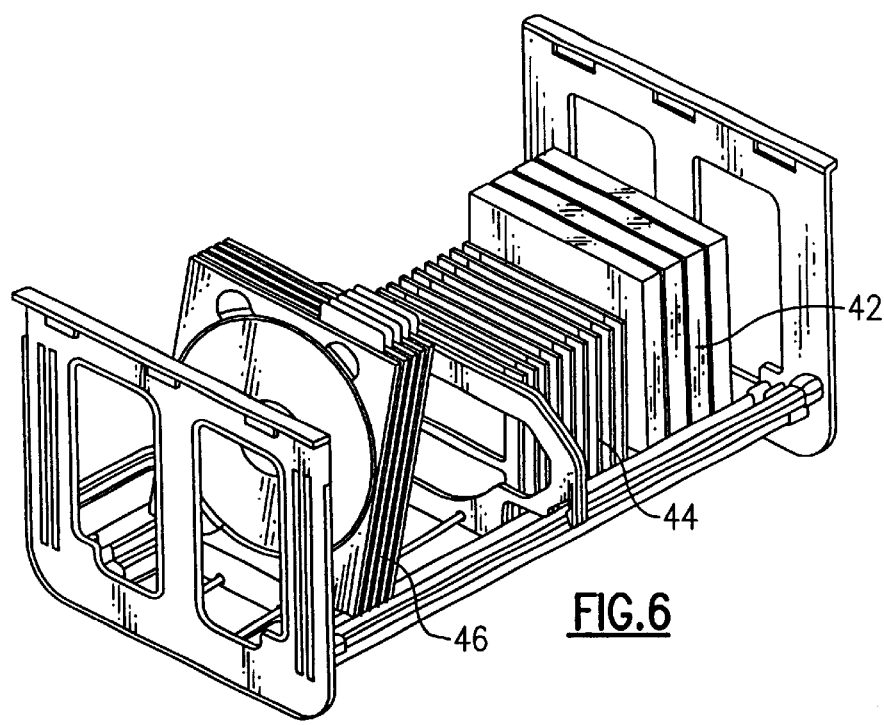
FIG. 6 illustrates the embodiment of FIG. 1 with various sized disc media stored therein.

FIG. 6 illustrates the rack of FIGS. 1 and 2 supporting a variety of disc media, for example, CDs 42, floppy discs 44 and CD ROMs 46 located by the ribs and recesses previously referred to.

Figure 7:
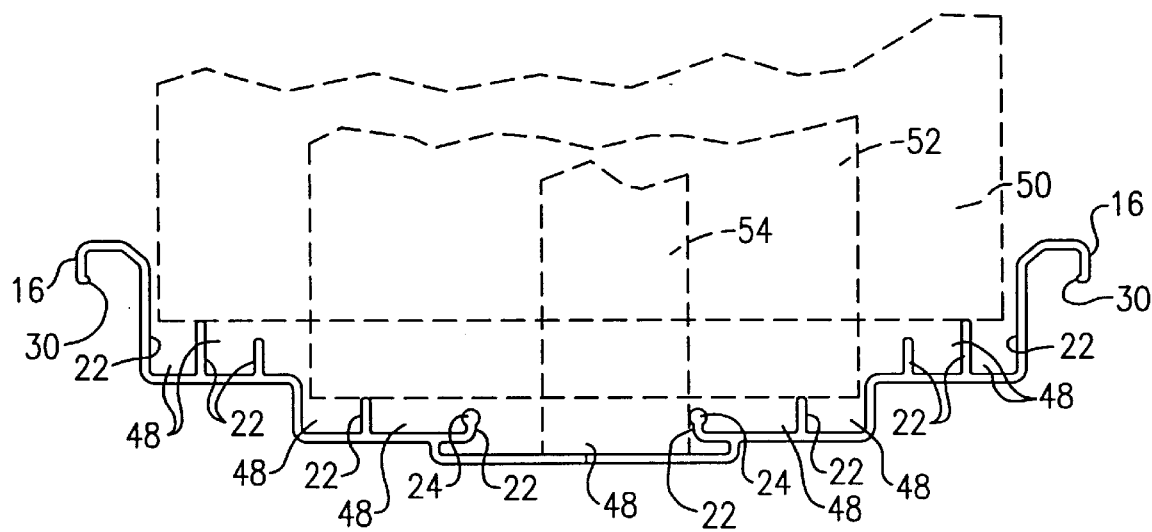
FIG. 7 illustrates a cross-section of the base of the embodiment of FIG. 1 with the manner of accommodating various media including VHS tapes.

FIG. 7 is a cross-section of the base 2 with the outer edges 14 and 16, ribs 22, beads 24 and associated recesses 48. In this Figure, the ends and divider are omitted. The dashed line 50 represents the location of a CD or CD ROM when stored in the rack, while dashed line 52 represents the location of a floppy disc and dashed line 54 represents a VHS tape stored longitudinally in place of the disc media stored transversely.

List of references 2 base
4 first end
6 second end
8 base support
10 base support
12 divider
14 outer edge
16 outer edge
18 mounting features
20 mounting features
22 ribs
24 beads
26 openings
28 screw holes
30 beads
32 bracket
34 channel
36 detent
38 end mounting bracket 40 channel
42 CDs
44 floppy discs
46 CD ROMs
48 recesses
50 dashed line
52 dashed line
54 dashed line

What is claimed is:

1. A media storage rack for storing a plurality of different media comprising an elongate media support base fixedly connected and supported between first and second rack ends, the support base defining a plurality of pairs of spaced elongate parallel ribs and recesses extending from a first end to a second end of the support base and being sized and positioned to support and locate the plurality of media securely in the media storage rack in an upright orientation, the base further comprising side rails each formed as an inverted U-shape to facilitate side mounting of the media storage rack on a cooperating bracket;

wherein the inverted U-shape is of a re-entrant form to resiliently engage a cooperating feature of the cooperating bracket.

2. The media storage rack according to claim 1, wherein the base is mounted by a press fit to the first and second rack ends.

3. The media storage rack according to claim 2 further comprising a divider slidably disposed on the base for slidable movement therealong.

4. The media storage rack according to claim 3, wherein there is sufficient friction between the divider and the base for the divider to remain in a desired position relative to the base in the presence of stored media thereon.

5. The media storage rack according to claim 3, wherein the divider is captively supported on the base.

6. The media storage rack according to claim 1, wherein the ribs and recesses are symmetrically disposed transversely of the elongate extension of the base in pairs, and each pair is arranged to support and locate a media of a desired size.

7. The media storage rack according to claim 1, wherein the first and second rack ends define rack support mounting members for engagement with rack end support brackets.

8. The media storage rack according to claim 1, wherein the media storage rack comprises an alternative mounting mechanism for supporting the media storage rack by any of side mounting, one end mounting and combined first and second end mounting.

9. A media storage rack for storing a plurality of different media comprising an elongate media support base fixedly connected and supported between first and second rack ends, the support base defining a plurality of pairs of spaced elongate parallel ribs and recesses extending from a first end to a second end of the support base and being sized and positioned to support and locate the plurality of media securely in the media storage rack in an upright orientation, the base further comprising side rails each formed as an inverted U-shape to facilitate side mounting of the media storage rack on a cooperating bracket;

wherein the base is mounted by a press fit to the first and second rack ends; and a divider is captively supported and slidably disposed on the base for slidable movement therealong, and the divider is captively supported by engagement of re-entrant openings in the divider with elongate beads on two of the parallel ribs.

* * * * *